United States Patent Office 3,352,801
Patented Nov. 14, 1967

3,352,801
SEQUESTERING ION EXCHANGE RESINS
Le Roy A. White, Root Road, Somers, Conn. 06604
No Drawing. Filed Mar. 16, 1964, Ser. No. 352,370
14 Claims. (Cl. 260—2.2)

This is a continuation-in-part of application Ser. No. 765,924 filed Oct. 8, 1958, and now abandoned.

The present invention relates to ion exchange resins and, more particularly, ion exchange resins which comprise a chelating molecule attached to a nitrogen-containing polymer by connection to nitrogen in or on the polymer chain and methods of preparation. The chelating agent comprises an amino carboxylic acid, an amino phosphoric acid, an amino sulfonic acid, an ether carboxylic acid, an ether phosphonic acid or an ether sulfonic acid.

Ion exchange resins are known and are commercially available for a variety of uses. Many commercial operations require water or water solutions which are substantially free of trivalent cations, such as ferric ions; monovalent cations, such as sodium, however, are often not objectionable in such operations. The prior art methods of removing multivalent cations from aqueous solutions embody the following materials:

(1) Sulfated or carboxylated insoluble resins;
(2) Inorganic siliceous materials;
(3) Sequestering agents.

These materials suffer from the following defects:

(1) Sulfated and carboxylated insoluble resins, such as sulfated styrene/divinyl benzene copolymers, sulfated coal and crosslinked polyacrylic acid, indiscriminately remove all cations from solution rather than selectively removing only the multivalent cations. Unnecessary removal of monovalent ions causes the unnecessary expense of regenerating the ion exchange resin more frequently than would be required if only the multivalent ions were removed.

(2) Inorganic siliceous materials, such as zeolites, do not in general suffer from the aforementioned defect. However, their efficiency in preferentially removing multivalent ions is not sufficiently high to justify their use in many processes where they have other disadvantages, e.g., silicates are not used in metals purification procedures since any attempt to leach out absorbed metals will usually destroy the silicate. In addition, the inorganic siliceous materials are readily soluble in water unless the pH is carefully controlled and thus cause procedural difficulties.

(3) Sequestering agents, such as ethylene diamine tetra-acetic acid, are useful in many operations where it is necessary to remove multivalent cations. However, such sequestering agents are preferably not used in the manufacture of beverages, such as wine or beer, to prevent the formation of precipitates caused by multivalent cations, since the sequestering agents effectively remove calcium from teeth. Also, where the multivalent cations can enter into chemical reactions, the sequestering agents are of limited effectiveness because they will continuously release the cation to maintain the reaction equilibrium as the cations in solution are consumed.

It is, therefore, an object of this invention to provide ion exchange resins which will remove multivalent cations from solutions in preference to monovalent ions.

It is another object to produce ion exchange resins which comprise a chelating molecule attached to a nitrogen-containing polymer by connection to the nitrogen in the polymer chain.

It is another object of the present invention to provide a simple, convenient and effective method of synthesis of a sequestering ion exchange resin.

It is another object to produce insoluble resins having far greater affinity for multivalent ions than for monovalent ions which do not suffer from the defects of the prior art, such as those mentioned above.

These and other objects and the nature and advantages of the present invention will be apparent from the following description.

The objects of this invention are attained by attaching a sequestering grouping to a polymer chain at a nitrogen atom in or on the chain. The sequestering agents of this invention comprise amino carboxylic acids, amino sulfuric acids, amino phosphonic acids, ether carboxylic acids, ether sulfuric acids and ether phosphonic acids. These sequestering agents have chemical structures containing 2 or 3 amino or ether coordinating groups, three or more acid groups (i.e. carboxyl, phosphonic or sulfonic) and a multiplicity of methylene groups between the acid and coordinating groups so arranged that three or more cyclical structures may be formed with the absorbed trivalent metal during use of the resin. Each of these cyclical structures should contain from 5 to 7 units including the metal, the cordinating group and the acid group. As an example a cyclical group in ethylene diamine tetraacetic acid is shown:

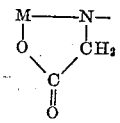

where M is the trivalent metal.

The preferred method involves halogenating sequestering agents containing active hydrogen and then reacting this sequestering agent with an amine containing resin. It is preferred to halogenate with chlorine or bromine. When brominating a sequestering-agent containing a phenolic group it is necessary to use excess bromine since some bromine reacts with the phenol benzene ring. The sequestering agents utilized are compounds which will preferentially bind multivalent ions to its structure in preference to monovalent ions. Organic compounds containing sulfur groups, ether groups, nitrogen groups, keto groups, hydroxyl groups, and acidic groups show this ability to varying degrees, but the preferred sequestering agents contain ether and/or amine chelating structures.

It is essential that the sequestering grouping be attached to the polymer chain as a side-group and not in itself a link connecting two segments of the chain. If the sequestering grouping becomes a link in the chain, its ability to chelate a metallic ion is seriously hampered. Thus —(R—N—Seq.)$_n$— is undesirable while

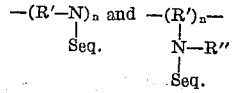

are desirable, where Seq. is the sequestering grouping, R″ is hydrogen or a low molecular weight non-reactive radical, and R′ represents either an organic group or a repeating organic group.

It is understood that while the present ion exchange chelating resins have a plurality of repeating units of the general formula

or

a sequestering group will not in general be attached to every nitrogen in the polymer chain. It is believed that the sequestering groups will be attached to only about one out of every four nitrogens in the polymer chain.

The following examples illustrate the chelating resins of the present invention having a plurality of the following repeating units therein:

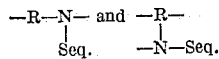

wherein R is an organic group and Seq. is the attached sequestering grouping having a molecular weight less than 1000 and having the general formula

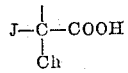

wherein J is selected from the group consisting of —H, —COOH and

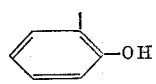

and Ch is a chelating component consisting of members selected from the group containing ether and/or amine chelating structures.

Example 1

The first series of sequestering agents (amine chelating groups) have the general formula:

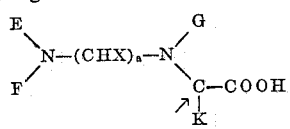

wherein the arrow indicates the position the sequestering agent is attached to nitrogen in the polymer chain:

a=1 to 3;
—X=H or —(CH₂)₆COOH;
—K=—H or

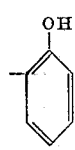

and —E, —F, and —G are selected from the group consisting of

—H, —CH₂COOH, —CH(COOH)₂, —CH₂CH₂OH

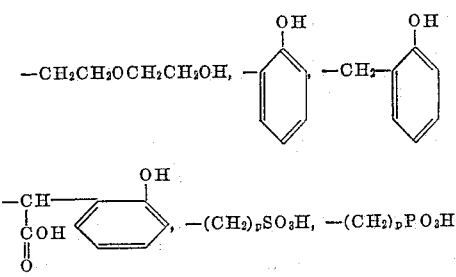

and not to exceed one unit of

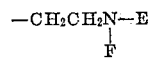

wherein p is an integer from 0–2 inclusive.

Specific examples of sequestering groups under Example 1 are as follows:

Example 1a

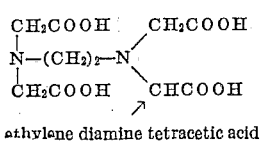

ethylene diamine tetracetic acid

Example 1b

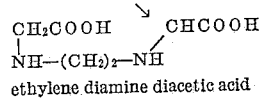

ethylene diamine diacetic acid

*Preparation of ethylenediamine diacetic acid*

Charge:
Water _____ ml__ 500
Ethylenediamine (1.1 mols) _____ g__ 66
Chloroacetic acid (2.2 mols) _____ g__ 208
Sodium hydroxide (4.4 mols) _____ g__ 175

Water and diamine were charged to a beaker fitted with a magnetic stirrer and pH electrodes. A 20% chloroacetic acid solution was added slowly at 70° C. Sodium hydroxide was added as required to maintain the pH at 10±0.5. Chloroacetic acid was added over a 4-hour period and heating was continued at 100° C. for 1 hour, allowing excess water to distill off. Yield, 1000 grams water solution.

Example 1c

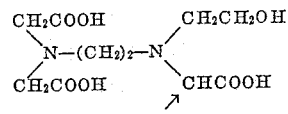

N(beta-hydroxyethyl)-ethylene-diamine triacetic acid

Example 1d

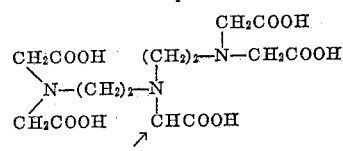

diethylene-triamine-penta-acetic acid

Example 1e

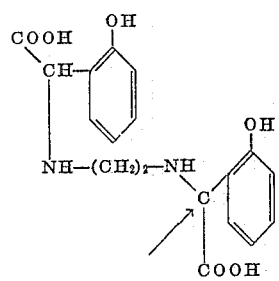

ethylene-diamine-di(O-hydroxy-phenyl acetic acid)

Example 1f

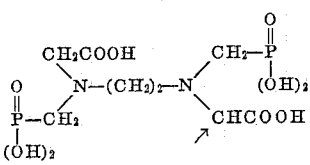

ethylene-diamine-diacetic acid-dimethylene phosphonic acid

*Preparation of ethylenediamine diacetic acid dimethylene phosphonic acid*

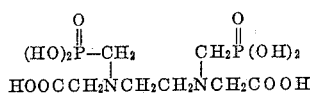

| Charge: | Mols |
|---|---|
| Ethylenediamine diacetic acid | 0.55 |
| Chloromethyl phosphonic acid | 1.1 |
| Cupric chloride | 1.1 |
| Sodium hydroxide | 3.5 |

Chloromethyl phosphonic acid in water solution was added slowly to the ethylenediamine diacetic acid solution while maintaining the pH at from 10 to 11.5 with continuous sodium hydroxide solution addition. After 3 hours at 72° C. and 4 hours at 100° C., the copper chloride was added. An additional hour at 90° C. was required before the theoretical amount of sodium hydroxide was in solution. 120 grams of potassium sulfide was added to precipitate copper sulfide. Copper sulfide was filtered out and 270 cc. concentrated hydrochloric acid was added. Water and $H_2S$ were distilled out under vacuum at 50° C. until the mix was too thick with sodium chloride-potassium chloride crystals to stir. Product fraction was filtered off and crystals were washed with 15% hydrochloric acid. The filtrate was concentrated further at 50° C. under vacuum, and most of the remaining sodium chloride-potassium chloride was filtered off. The product was precipitated by the addition of methanol. The product was filtered out and immediately placed in a vacuum oven to dry. The filtrate was concentrated further by evaporation at room temperature in an air stream, and a second product fraction was precipitated out with methanol. The filtrate was concentrated further and additional fractions were obtained.

Fraction:                                              G.
1, Off-white powder _____ 88
2, Off-white powder _____ 36
3, Tan powder _____ 12
4, Light tan powder _____  6
5, Dark brown, very hygroscopic material _____ 20

Analysis of Fraction 1:

TABLE 1

| Element | Theoretical, Percent | Actual Percent |
|---|---|---|
| C | 26.5 | 25.5 |
| H | 5.0 | 5.7 |
| N | 7.7 | 7.8 |
| O | 44.2 | *44.7 |
| P | 16.6 | 16.3 |

* By difference.

*Example 1g*

$$\begin{array}{cc} CH_2COOH & CH_2CH_2SO_2OH \\ | & | \\ N-(CH_2)-N & \\ | & | \\ CH_2CH_2SO_2 & CH-COOH \end{array}$$

ethylene-diamine-diacetic acid-diethylene sulfonic acid

*Preparation of the sequestering agent: ethylene-diamine-diacetic acid-disulfonic acid*

$$\begin{array}{cc} HOSO_2CH_2C & CH_2CH_2SO_2OH \\ | & | \\ HOOCCH_2N-CH_2CH_2NCH_2COOH \end{array}$$

Charge:
Ethylenediamine diacetic acid disodium salt
　　　　　　　　　　　　　　　　mol__ 0.057
Bromoethylene sodium sulfonate (24 grams)
　　　　　　　　　　　　　　　　mol__ 0.1135
Sodium hydroxide _____gms__ 4.3

To a beaker fitted with a hot-plate magnetic stirrer, pH electrodes and thermometer, ethylenediamine diacetic acid solution was charged and bromoethylene sodium sulfonate solution and NaOH were slowly added at room temperature, keeping the pH at 10. Temperature was then raised over the course of ¾ hour to 70° C. Temperature of 70° C. was maintained 20 minutes, at which time reaction appeared to be complete. Solution was concentrated by room temperature evaporation in an air stream and precipitated sodium bromide was filtered out. The pH was adjusted to 8, and 3 product fractions were isolated by successive methanol addition, precipitation filtration and concentration of the solution. Some sodium bromide came down with the product. Expected sulfur-to-carbon ratio: 0.534; found: 0.525.

*Example 2*

Amino triacetic acid, although somewhat inferior to the other sequestering agents of the present invention, may also be used:

$$HOOC-CH_2-N\begin{array}{c} CH_2COOH \\ \\ CHCOOH \end{array}$$

*Example 3*

Another series of sequestering agents (ether-amine chelating groups) useful in the present invention have the general formula:

$$\begin{array}{c} E \\ | \\ N-(CXH)_a-O-(CXH)_a-N \\ | \\ F \end{array}\begin{array}{c} G \\ \diagdown \; K \\ C-COH \\ \diagup \; \| \\ O \end{array}$$

wherein —E, —F, —X, a, —G and —K are the same as in Example 1.

Specific examples of sequestering agents under Example 3 are as follows:

*Example 3a*

$$\begin{array}{cc} CH(COOH)_2 & CH_2COOH \\ | & | \\ N-(CH_2)_2-O-(CH_2)_2-N \\ | & | \\ CH_2CH_2OH & CHCOOH \end{array}$$

*Example 3b*

$$\begin{array}{c} \bigcirc-OH \\ | \\ N-CH_2-O-CH_2-N \\ | \\ CH_2COOH \end{array}\begin{array}{c} CH_2CH_2OH \\ \\ CHCOOH \end{array}$$

*Example 4*

Another series of sequestering agents useful in the present invention contain ether chelating groups and have the general formula:

$$T-O-(CHY)_a-O-\underset{\underset{CHCOOH}{|}}{\overset{\overset{A}{|}}{C}}-B$$

wherein $a=$ an integer of from 1 to 3;

$$-T=A, \quad -\underset{D}{\overset{B}{\underset{|}{C}}}-B, \quad \bigcirc-OH$$

or $$\bigcirc-COOH$$

—Y=—H, —COOH, or —OH; and —A, —B, and —D are selected from $$-\overset{OH}{\underset{|}{C}}H-COOH, -CH_2COOH, -COOH, -H, -SO_2OH$$

$$-PO_3H_2, -CH_2PO_3H_2, -CH_2SO_3H, -\bigcirc^{OH}, -\bigcirc^{COOH}$$

and —(CHY)$_b$—O—T not to exceed one such unit, where $b=$ an integer of from 1 to 3.

Specific examples of sequestering agents under Example 4 are as follows:

*Example 4a*

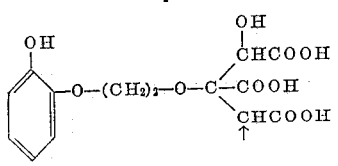

*Example 4b*

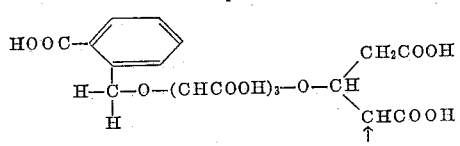

Example 5

Another series of sequestering agents useful in the present invention and containing ether chelating groups have the following general formula:

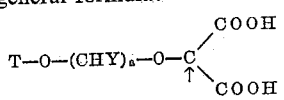

wherein —T, —Y, and $a$ are the same as in Example 4.

Specific examples of sequestering agents under Example 5 are as follows:

*Example 5a*

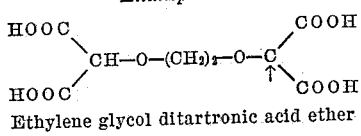

Ethylene glycol ditartronic acid ether

*Example 5b.—Preparation of diethylene glycol ditartronic acid ether*

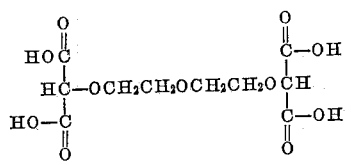

To a three-neck flask, fitted with stirrer, dropping funnel, thermometer, and $N_2$ inlet was charged 160 gm. sodium carbonate (1 mole), 160 gm. of diethyl malonate (1 mole) and 450 gm. thiophene-free benzene distilled from sodium. 160 gm. of bromine were added slowly over the course of 6 hours. The temperature was maintained at 30–35° C. After an additional 2 hours stirring, all of the bromine color was gone. The bromodiethyl malonate was separated from salts by filtration. To another three-neck flask fitted with stirrer, thermometer, nitrogen inlet, reflux condenser and dropping funnel, was charged 1 mole of lithium dispersion in wax and 250 cc. of sodium dried benzene. Diethylene glycol dried 8 hours in a 60° C. vacuum oven was then added dropwise. The reactor was heated to 37° C. and the glycol feed was started. Temperature was maintained by occasional immersion in a methanol bath at 40° C. After one hour all of the diethylene glycol was added. After an additional 10 minutes no further cooling was required. The batch was heated over the course of one hour to 54° C. The lithium adduct was a gray thick slurry-solution. The bromo diethyl malonate was then started, but after one-half hour the slurry become extremely thick. It was found that an additional 500 cc. of distilled tetrahydrofurane and a temperature of 70° C. would maintain a fluidized mixture while the additional bromomalonate was added. The bromomalonate was added at 70° C. over an 8 hour period. The mixture was cooled and exposed to the atmosphere for 24 hours. Water was added to separate a benzene layer. This benzene layer was found to contain the lithium's paraffin wax. The remainder of the mixture was thinned with 200 cc. of methanol and filtered. 20 cc. of 20% hydrogen peroxide was added, stirred in, 300 cc. water was then stirred in and the mix allowed to settle for 18 hours. The upper layer was discarded and the lower layer was hydrolyzed with a solution of 90 gm. sodium hydroxide, 90 gm. water, 200 cc. methanol. The mixture exothermed and was allowed to stand 18 hours. Water was added to dissolve the mixture and the mixture was heated. The 600 cc. of solution was filtered and heated an additional 4 hours at 60–70° C. Alcohol was then added continuously and three fractions were filtered off. The least soluble fraction was passed through an acidified Dowex 50 (sulfonated polystyrene) ion exchange column. The effluent was evaporated and found to be malonic acid. The second fraction was passed through an ion-exchange column and evaporated. The product was a thick yellow liquid with some crystals. The product was dissolved in acetone and the acetone evaporated. The product was titrated with sodium hydroxide, found 70.3 gm. per carboxyl (77 g.) theoretical). The product was titrated with ferric chloride at a pH of 4, salicylic acid indicator, found 1.1 moles Fe ion per 310 gms. (one theoretically). The third fraction was apparently either decarboxylated malonate-glycol-malonate, or partly reacted glycol malonate. Two fractions were isolated, fraction (2) insoluble in cold acetone, sodium hydroxide titre 230 gm. per carboxyl, and fraction (b) soluble in acetone, 120 gm. per carboxyl.

Example 6

Another series of sequestering agents of the present invention having ether and amine chelating groups have the following general formula:

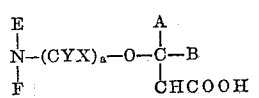

wherein:

$a$ is an integer from 1 to 3;

—X is selected from the grouping consisting of —H and one unit only of —(CH$_2$)$_6$COOH per sequestering unit;

—Y is selected from the grouping consisting of —H, —COOH, and —OH;

—E and —F are the same as in Example 1;

—A and —B are the same as in Example 4.

Specific examples of sequestering agents under Example 6 are as follows:

*Example 6a*

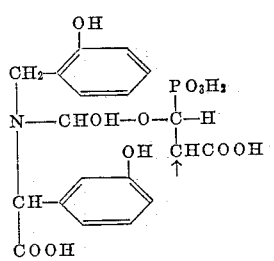

*Example 6b*

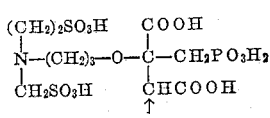

Example 7

Another series of sequestering agents used in the present invention having ether and amine chelating groups have the following general formula:

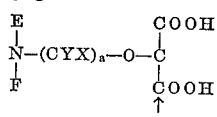

wherein E, F, Y, X, and $a$ have the same definition as indicated above.

Specific examples of sequestering agents under Example 7 are as follows:

Example 7a

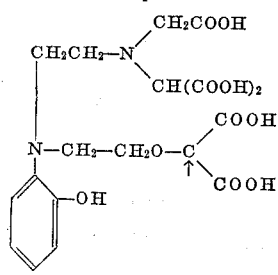

Example 7b

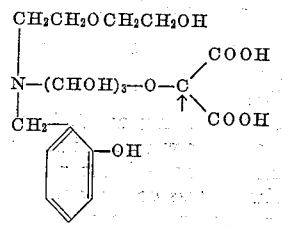

Example 8

Another series of sequestering agents useful as sidegroups in ion exchange resins in accordance with the present invention and having ether and amine chelating groups have the following general formula:

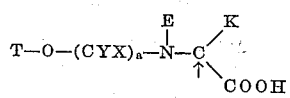

wherein E, T, Y, X, $a$, and K have the same definitions as indicated above.

Specific examples of sequestering agents under Example 8 are as follows:

Example 8a

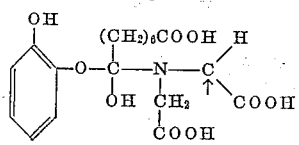

Example 8b

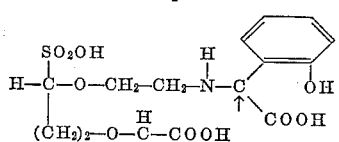

Example 8c

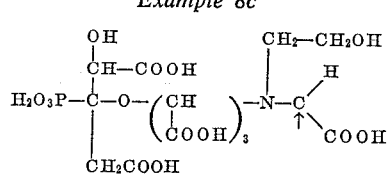

The exact nature of the polymer chain to which the ether and/or amine sequestering grouping is attached is not overly important except with regard to the following factors:

(1) The polymer must contain nitrogen to which the sequestering agent may attach as a grouping, i.e. it must be a polyamine or a polyimine;

(2) The polymer must have not only active nitrogens for the sequestering agents but must also have sufficient reactive substituents to facilitate crosslinking of the polymer chain;

(3) The preferred polymers contain 5–33% nitrogen in the form of amine groups.

Suitable polymers include, but are not limited by:

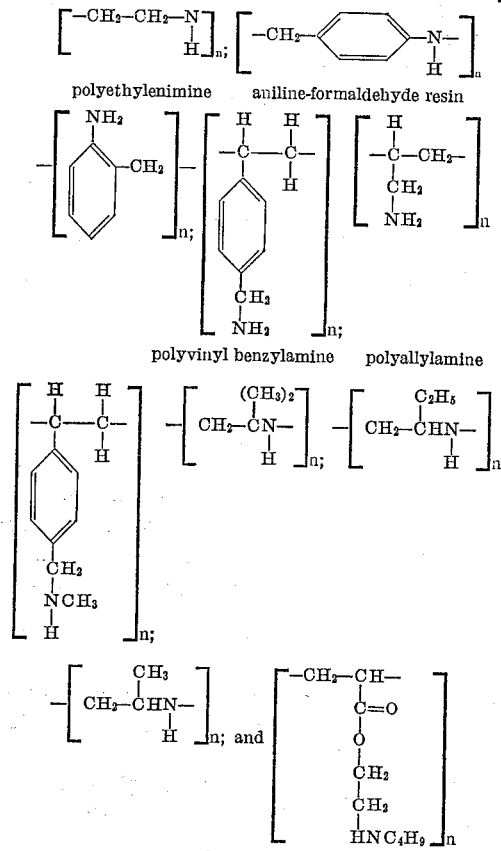

or any polymer having the general formula

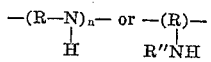

wherein R is an organic grouping and R″ is an organic grouping or hydrogen.

It is understood that the nitrogen containing monomers can be not only homo-polymerized, but can also be co-polymerized with one another or even with monomers which do not contain nitrogen, in which case, however, there will be fewer sites to which the sequestering agent can attach.

Crosslinking agents, which are preferably utilized after reaction of the polymer with the sequestering agent, encompass difunctional comonomers such as divinyl benzene, methylene bis acrylamide, glycol dimethacrylates; aldehydes such as formaldehyde, glutaraldehyde; polyepoxides such as Bisphenol A - epichlorohydrin reaction product; halohydrins such as epichlorohydrin; haloethanes such as dibromoethane; polyisocyanates such as toluene diisocyanate; methylol derivatives such as dimethylol urea; polyisothiocyanates such as toluene diisothiocyanate; and silanes such as chlorosilane, alkoxy silanes, and partially hydrolyzed alkoxy silanes.

The following examples relate to the ion exchange sequestering resins in accordance with the present invention.

Example 9

Ethylene diamine tetracetic acid in aqueous solution is halogenated in accordance with the following procedure:

1. *Preparation of brominated ethylenediamine tetracetic acid*

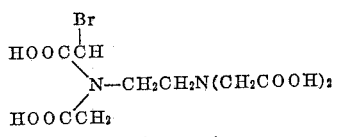

Charge A 115 g. (0.4 mol) Ethylenediamine tetracetic acid 1000 g. Water
32 g. (0.8 mol) Sodium hydroxide

Charge B 21.8 cc. (0.4 mol) Bromine
30 g. Sodium hydroxide

The bromine and sodium hydroxide (B) were added at 25° C. to a beaker of (A) fitted with a magnetic hot-plate stirrer, pH electrodes and thermometer. pH was maintained at 7. The halogenated sequestering agent is then reacted with an aqueous solution of polyethylenimine according to the following reaction:

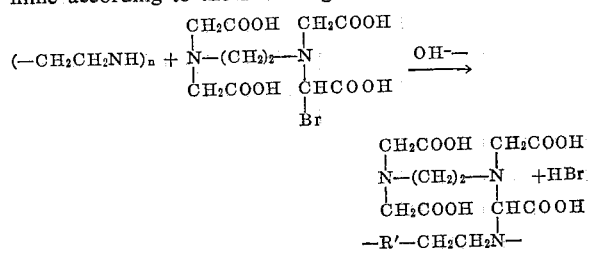

The polymer is then insolubilized with dibromo ethane by heating and stirring the slurry until water is evaporated and continuing heating the residual mass for 1 hour at 120° C.

Example 10.—Preparation of polyethylenimine - ethylene diamine diacetic acid dimethylene phosphoric acid sequestering resin A beaker, agitated by a magnetic hot-plate stirrer, was fitted with a thermometer and pH electrodes.

Charge A 700 ml. Water
72.8 g. (0.2 mol) Phosphonic sequestering agent fraction 1 (from Example 1f above)
17.3 g. Sodium hydroxide

Charge B 10.9 cc. (0.2 mol) Bromine
16.4 g. Sodium hydroxide in 10% solution The bromide and second sodium hydroxide charge were added slowly at a pH of 7, at 30° C. The pH was maintained at 7. After completion of the bromine addition, 0.18 mols (15.5 grams, 50% solution) of polyethylenimine, having a molecular weight of 30,000–40,000, were added. The pH was maintained at 8.5 to 9 with the gradual addition of 5 grams of NaOH in solution. Temperature was increased over a 2-hour period from 30° C. to 33° C. The solution was cooled and 1.6 grams of 40% by volume formaldehyde was added. Excess water was evaporated at 100° C., leaving the crosslinked resin behind. The resin was then soaked in water, pulverized in a Waring Blendor, and extracted with sodium hydroxide and distilled water.

10 cc. of the extracted resin-water slurry were titrated with 0.2 grams salicylic acid and a ferric chloride solution containing 0.382 millimols of ferric iron per ml. The 10 cc. or resin slurry took 3.0 cc. of ferric chloride solution before turning purple. This amounts to 1.14 milliequivalents of iron. The slurry was evaporated and found to contain 0.508 grams of solids. This would amount to a pickup of 2.22 milliequivalents of iron per gram of resin solids. (By way of contrast, 10 cc. of Dowex A–1 Chelating Resin took 4 cc. of ferric chloride solution before turning purple (1.5 meq. ferric iron). The slurry was evaporated and found to contain 1.4 grams of dry beads. The resin thus absorbs 1.07 meq. of iron per gram of dry resin.) Dowex 50W–X2 (sulfonated styrene beads), washed with NaOH and water, was found to take 0.6 cc. of the ferric chloride solution (0.23 millimols). After evaporation of the water, 2.15 grams of resin remained. The titration would then be equivalent to 0.11 meq. of iron per gram of dry sulfonated resin.

Example 11

Utilizing the sequestering agent of Example 1g, a sequestering polymer was produced as follows:

*Preparation of the sequestering polymer*

Charge 5.9 g. (0.0135 mols) Sulfonated sequestering agent
30 ml. Water
2.17 g. (0.0135 mols) Bromine
1.05 g. Sodium hydroxide in water solution Bromine and sodium hydroxide were added with stirring at 25° C., and the pH was maintained at 7. Polyethylenimine, 50% solution, 1.4 gms., was then added to the brominated sequestering agent. The pH was maintained at 10; the solution was heated at 70° C. for 3 hours, 0.3 gms. sodium hydroxide being required to maintain the pH. The solution was cooled and 0.75 gms. of 25% glutaraldehyde solution was added. The water was evaporated at 100° C., and the resin was extracted with NaOH and water. Resin titrates 1.2 cc. iron solution per/10 cc. resin (or 0.458 meq. Fe/0.92 g. or 0.5 meq. Fe/gm.). Analysis 4.4% S, 1.5% ash (27% sequestering agent).

Example 12

The same polymer as formed in Example 9 is again prepared. In this procedure an alcohol ester of ethylene diamine tetra-acetic acid is halogenated, the alpha-chloro sequestering agent is then reacted with polyethylenimine and the resultant ester is reacted with caustic to reliberate the free acid or salt. The resin is insolubilized with epichlorohydrin.

Example 13

Aniline-formaldehyde resin (13% nitrogen) is reacted under acidic conditions with chlorinated ethylene diamine tetracetic acid:

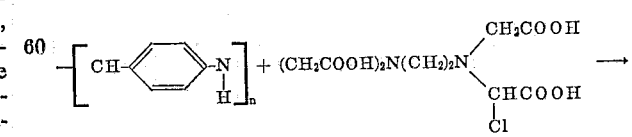

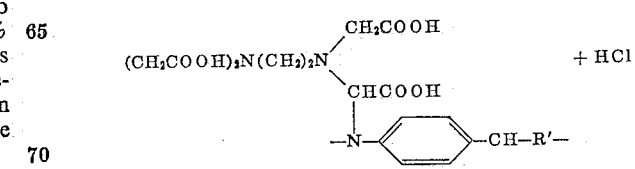

The resin was crosslinked with dimethylol urea. The exchange capacity was relatively low.

Example 14

Polyethylenimine and mono bromoethylene diamine tetraacetic acid reaction product:

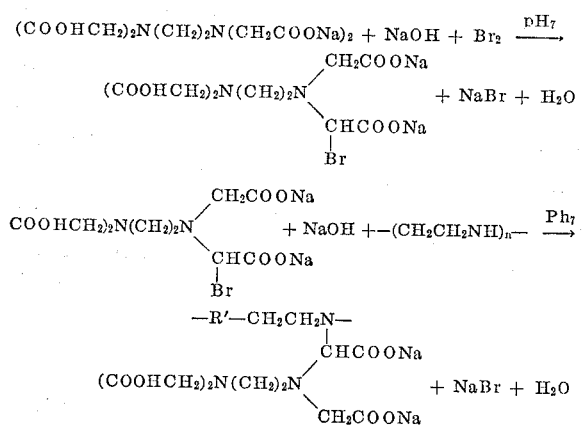

Ingredients:
- 0.2 moles disodium ethylenediamine tetraacetic acid.
- 500 cc. water.
- 0.2 moles bromine.
- 0.4 moles sodium hydroxide in 60 cc. water (caustic solution).
- 0.2 moles polyethylenimine in 300 cc. water.
- 0.2 moles formaldehyde.

The water and disodium ethylene diamine tetraacetic acid are charged to a one liter three neck flask fitted with agitator, thermometer, bromine inlet, caustic inlet, and condenser.

The bromine is added in a slow stream. Half the caustic solution is added as required to prevent the hydrogen bromine by-product from precipitating the disodium ethylene diamine tetraacetic acid.

The temperature is maintained at 20–30° C. After 3 hours, the reaction mixture, consisting largely of sodium bromide and disodium ethylene diamine triacetic acid mono bromoacetic acid is poured into the polyethylenimine solution. The remaining sodium hydroxide is added as required to maintain the pH at approximately 7 as the mixture is heated to 60° C. After 2 hours, the formaldehyde is added and the mix is evaporated slowly in a shallow container. The cross-linked polymeric residue is crushed and extracted successively with warm hydrochloric acid, warm caustic, and hot water.

A small quantity of this resin was added to test tube containing a dilute solution of ferric chloride, sodium chloride, and salicylic acid. All of the purple color of the ferric-salicylic complex was removed, indicating complete removal of the ferric ions by the resin. Similar results were obtained with the orange-brown uranium-salicylic complex.

It was found that resin saturated with ferric ions could be regenerated with acid. Resin saturated with sodium, magnesium or calcium ions was found to be capable of decolorizing dilute ferric salicylate.

The ferric ions displaced the ions of lower valence from the resin. Sulfonated styrene/divinylbenzene copolymer resin saturated with sodium, magnesium, or calcium does not discolor the solution, clearly showing that a sequestering unit attached to a polymeric chain accomplishes the objectives set forth, while sulfated ion exchange resins do not.

*Example 15.—Preparation of sequestering resin utilizing brominated ethylene diamine tetraacetic acid of Example 9*

Charge:
Brominated ethylenediamine tetraacetic acid _____ mol__ 0.1
Tetraethylene pentamine _____ g__ 6.3
Sodium hydroxide _____ g__ 3.46

The brominated ethylenediamine tetracetic acid and sodium hydroxide were added slowly to the tetraethylene pentamine. pH was maintained at 9.2, after decline of initial, very high pH.

Charge:
Tetraethylene pentamine _____ mol__ 0.02
Glutaraldehyde _____ mol__ 0.1

Heat at 60° C. for 1½ hours, separate the precipitate by filtration, chop up in Waring Blendor, and extract impurities with 2 gms. NaOH in solution and 2 liters of water passing through the resin in an ion exchange column. Titre 1.4 milliequivalents Fe+++ per gram resin.

Example 16

Brominated ethylene diamine tetracetic acid reacted with Amberlite IR–45, a commercial ion exchange resin containing free NH₂ groups.

Charge:
- 30 gms. Amberlite IR–45 (Rohm & Haas) resin containing a multiplicity of benzylamine groups
- 50 gms. water
- 0.1 mol brominated ethylenediamine tetraacetic acid
- 3.4 gms. sodium hydroxide The brominated ethylenediamine tetracetic acid and most of the NaOH were added at 30° C. pH is maintained at 9. Temperature is raised gradually to 80° C. Most of the beads distintegrated into smaller particles. The particles were washed with NaOH and distilled water and titrated with ferric chloride-salicylic acid. 10 cc. of beads were found to require 3.9 meq. of iron. Weight of the dried resin was 3.65 gms., hence titer was 1.07 meq. of iron per gram of dry resin.

Example 17

Diethylene glycol ditartronic acid ether-ion exchange resin. 5.1 gm. of the glycol malonic acid (0.0165 moles) obtained in Example 5b and 25 gm. water were mixed and sufficient NaOH was added to bring pH to 6. While maintaining the pH at 6 with 10% NaOH, 3 gm. (.019 moles) bromine were added dropwise. 1.2 gm. polyethylenimine was then added to the solution. The pH was maintained at 10 and solution was heated to 70° C. for one-half hour. The solution was then cooled and 0.8 gm. 25% glutaraldehyde solution was added. The solution was evaporated on a steam bath and cured further in a 60° C. oven. Water solubles were extracted. The water extract was retained. The insoluble materials were put into a Waring Blendor, chopped for 2 minutes, and extracted with 5% sodium hydroxide solution. The resin was then washed with water until the effluent was neutral. The resin was then titrated with ferric ion. Found: 6.1 milliequivalents Fe+++ per 10 cc. of resin or 2.8 milliequivalents Fe per gm. of resin.

The water extract was examined to find crosslinking agents possibly more efficient than glutaraldehyde. 10% solution of toluene diisocyanate-sodium bisulfite reaction product was added to half the extract. A brown precipitate formed which readily picked up cupric ion turning blue.

To the second fraction was added 10% epichlorohydrin in water and a yellow precipitate resulted. This precipitate readily picked up cupric ion and turned blue.

Example 18

Ethylene-diamine-di(O-hydroxy-phenyl acetic acid), note Example 1e, is chlorinated in a manner similar to that described above and is reacted with a nitrogen containing polymer as follows:

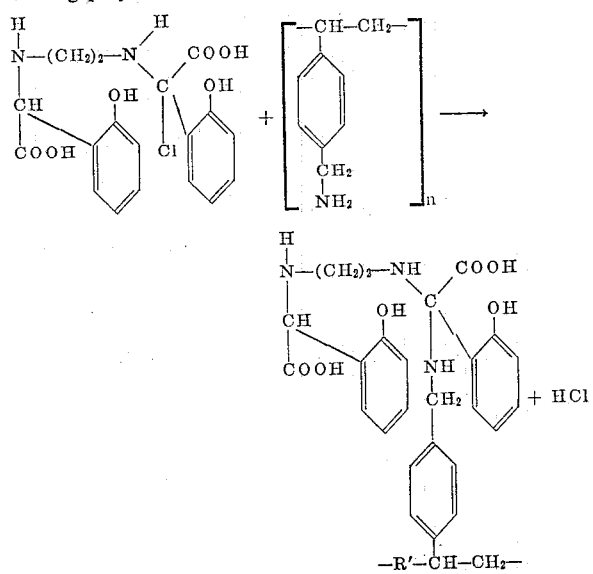

*Example 19*

Diethylene-triamine-penta-acetic acid, note Example 1d, is brominated in a manner similar to that described above and is then reacted as follows with a nitrogen containing polymer:

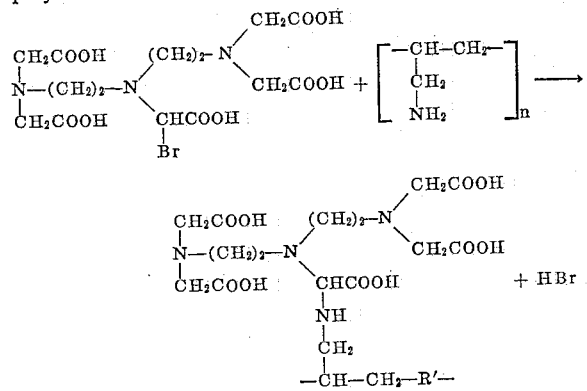

*Example 20*

N-(beta-hydroxyethyl)-ethylene-diamine triacetic acid, note Example 1c, is brominated in a manner similar to that described above and is then reacted with a nitrogen containing polymer as follows:

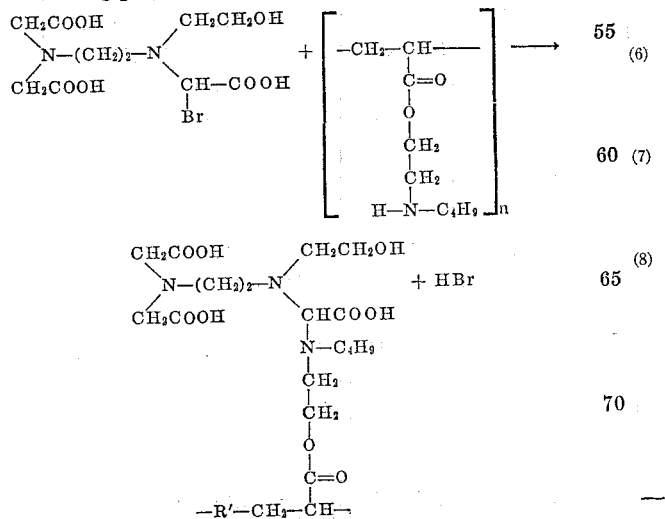

It has been found that resins prepared by this invention may be further strengthened should their wet strength be lacking in some cases, by means of drying the resin and impregnating the dried resins with monomer, a resin solution, or an emulsion, i.e. styrene/butadiene latex, polystyrene dissolved in benzene or chlorosulfonated polyethylene dissolved in benzene or ketones. Monomers may be polymerized if catalyst is added before impregnating with monomer. It is preferred to incorporate a hydrophilic monomer or comonomer rather than hydrophobic monomers such as styrene which retard the exchange rate when polymerized into the dried amine ion exchange granules. Bisphenol-epichlorohydrin condensation products were found to be particularly suitable for further hardening of polyamine resins.

It will be obvious to those skilled in the art that various changes may be made without departing from the spirit of the invention and therefore the invention is not limited to what is described in the specification, but only as indicated in the appended claims.

What is claimed is:

1. An ion exchange chelating resin having a plurality of repeating units therein having the formula

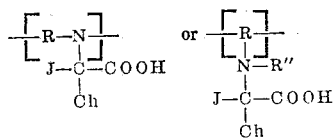

Wherein Ch is selected from the group of chelating components consisting of (1) 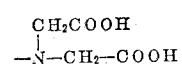

and the following having 2 or 3 amino or ether coordinating groups and 2 or more acid groups:

(2) 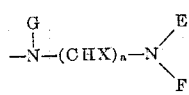

(3) 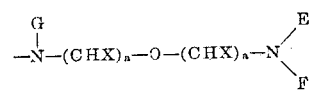

(4) 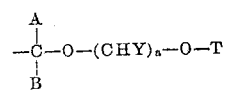

(5) 

(6) 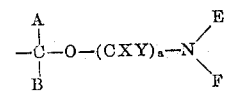

(7) 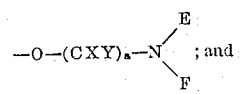

(8) 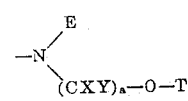

—J is— 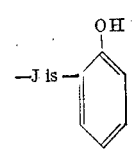

—H or —COOH; —R″ is —H or a lower alkyl group; $a$ is an integer of 1-3; —X is —H or not more than one unit of —(CH₂)₆COOH per sequestering molecule;
—K is —H or

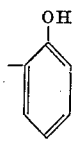

—E, —F and —G are —H, CH₂COOH, —CH(COOH)₂, —CH₂CH₂OH, —CH₂CH₂OCH₂CH₂OH,

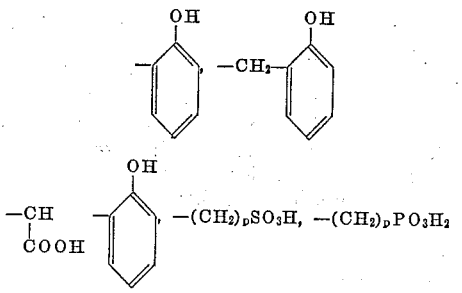

or not more than one unit of

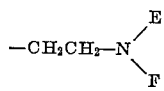

per sequestering molecule; p is an integer of 0–2;

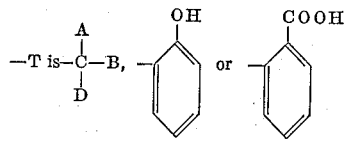

—Y is —H, —COOH or —OH;
—A, —B and —D are —CHOH-COOH, CH₂COOH, —COOH, —H, —SO₂OH, —PO₃H₂,

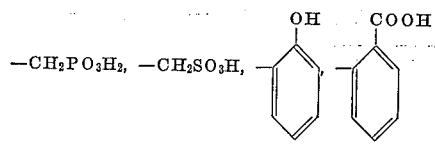

or not more than one unit of —(CHY)ₐ—O—T per sequestering molecule; and

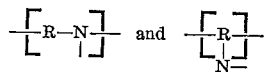

signify repeating amine or imine groupings in the chelating resin.

2. An ion exchange chelating resin in accordance with claim 1 wherein

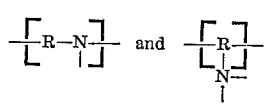

are repeating groups in polymers selected from the group consisting of polyethylenimine, aniline-formaldehyde resin, polyvinyl benzylamine, polyallylamine, copolymers of the monomers of the preceding polymers, and polymers comprising repeating units of

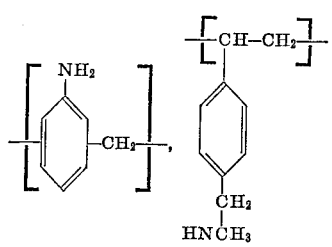

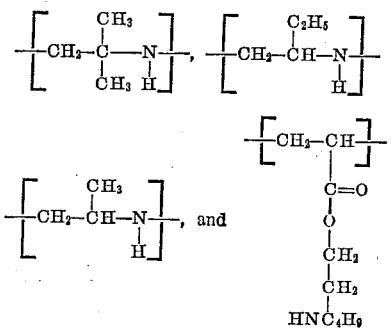

3. A chelating resin in accordance with claim 1, said resin being crosslinked by the reaction with a crosslinking agent of a difunctional comonomer, an aldehyde, a polyepoxide, a halohydrin, a haloethane, a polyisocyanate, a methylol derivative, a polyisothiocyanate, or a silane.

4. A chelating resin in accordance with claim 2 wherein said sequestering agent is selected from the group consisting of ethylene diamine tetracetic acid, N(beta-hydroxyethyl)-ethylene-diamine triacetic acid, diethylene-triamine-penta-acetic acid, ethylene-diamine-di-(o-hydroxy-phenyl acetic acid), ethylene-diamine-diacetic acid-dimethylenephosphonic acid, ethylene-diamine-diacetic acid-diethylene sulfonic acid, amino triacetic acid, ethylene glycol ditartronic acid ether, and diethylene glycol ditartronic acid ether.

5. An ion exchange chelating resin having a plurality of repeating units therein having the formula:

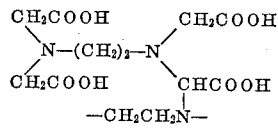

6. An ion exchange chelating resin having a plurality of repeating units therin having the formula:

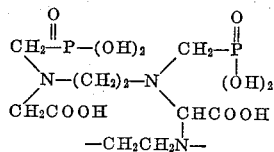

7. An ion exchange chelating resin having a plurality of repeating units therein having the formula:

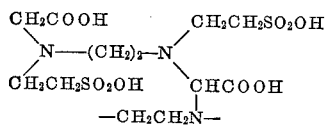

8. An ion exchange chelating resin having a plurality of repeating units therein having the formula:

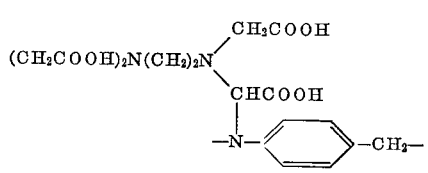

9. An ion exchange chelating resin having a plurality of repeating units therein having the formula:

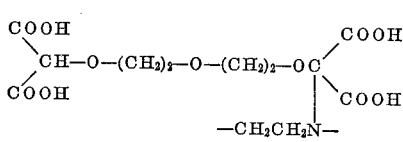

10. A method of forming a chelating resin in accordance with claim 1 comprising
(I) halogenating an active hydrogen on a carbon atom directly adjacent an acid radical of an amine or ether containing sequestering agent selected from the group consisting of (1) 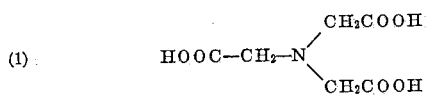

and the following having 2 or 3 amino or ether coordinating groups and 3 or more acid groups;

(2) 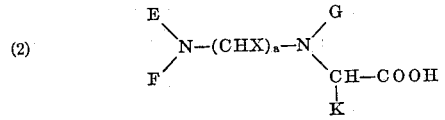

(3) 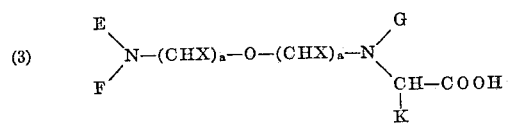

(4) 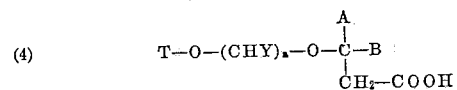

(5) 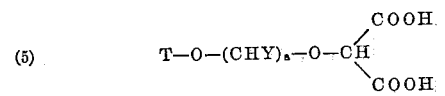

(6) 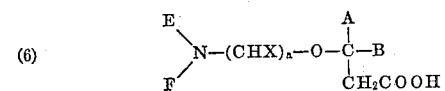

(7) 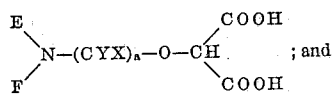 ; and (8) 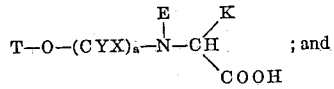 ; and (II) reacting said halogenated sequestering agent with a polymer containing a plurality of amine or imine groupings.

11. A method in accordance with claim 10 wherein said polymer contains 5–33% by weight of nitrogen atoms reactive with alpha-halo-carboxylic acids.

12. A method in accordance with claim 10 wherein said sequestering agent is halogenated in its acid form.

13. A method in accordance with claim 10 comprising esterifying said sequestering agent from its acid form, then halogenating said ester, then reacting said halogenated ester with said polymer, and treating the resultant resin to hydrolize the ester groups.

14. A method in accordance with claim 10 further comprising cross-linking said chelating resin with a compound selected from the group consisting of aldehydes, isocyanates, halohydrins, haloethanes, difunctional co-monomers, polyepoxides, methylol derivatives, polyisothiocyanates and silanes.

References Cited

UNITED STATES PATENTS

| 2,840,603 | 6/1958 | Mock et al. | 260—89.7 |
| 2,875,162 | 2/1959 | Morris | 260—89.7 |
| 2,910,445 | 10/1959 | Mock et al. | 260—86.1 |
| 3,228,920 | 1/1966 | D'Alelio | 260—86.1 |

FOREIGN PATENTS 164,722  9/1958  Sweden.

WILLIAM H. SHORT, *Primary Examiner.*

M. GOLDSTEIN, *Assistant Examiner.*

UNITED STATES PATENT OFFICE
CERTIFICATE OF CORRECTION

Patent No. 3,352,801                          November 14, 1967

Le Roy A. White

It is hereby certified that error appears in the above numbered patent requiring correction and that the said Letters Patent should read as corrected below.

Column 5, lines 42 to 46, for that portion of the formula reading:

same column 5, lines 51 to 53, the formula should appear as shown below instead of as in the patent:

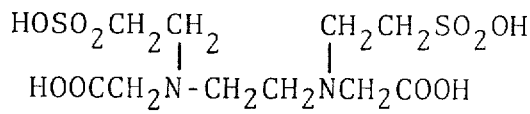

column 8, line 21, for "(77g.) theoretical)" read -- (77g. theoretical) --; column 11, line 74, for "10 cc. or resin" read -- 10 cc. of resin --.

Signed and sealed this 17th day of December 1968.

(SEAL)
Attest:

EDWARD M. FLETCHER, JR.                      EDWARD J. BRENNER
Attesting Officer                             Commissioner of Patents